United States Patent [19]

Child et al.

[11] Patent Number: 4,835,128

[45] Date of Patent: May 30, 1989

[54] METHOD FOR REDUCING THE EFFECTS OF METALS ON FCC CATALYSTS

[75] Inventors: Jonathan E. Child, Sewell; Ajit V. Sapre, West Berlin, both of N.J.

[73] Assignee: Mobil Oil Corporation, New York, N.Y.

[21] Appl. No.: 938,097

[22] Filed: Dec. 4, 1986

[51] Int. Cl.⁴ .................. B01J 38/72; B01J 21/20; C10G 11/18

[52] U.S. Cl. .................. 502/21; 208/52 CT; 208/113; 502/5; 502/38; 502/41; 502/516; 502/521

[58] Field of Search .................. 502/21, 41–44, 502/521, 525, 38, 516, 5; 208/52 CT, 113, 120; 209/138, 140, 142, 232

[56] References Cited

U.S. PATENT DOCUMENTS

| | | | |
|---|---|---|---|
| 2,567,207 | 9/1951 | Hoge | 208/52 CT |
| 4,257,919 | 3/1981 | Roberts et al. | 502/521 |
| 4,446,011 | 5/1984 | Wheelock et al. | 502/38 |
| 4,451,355 | 5/1984 | Mitchell et al. | 208/113 |

FOREIGN PATENT DOCUMENTS 0112601  7/1984  European Pat. Off. .

Primary Examiner—Paul E. Konopka
Attorney, Agent, or Firm—Alexander J. McKillop; Charles J. Speciale; Malcolm D. Keen

[57] ABSTRACT

A system is provided for passivating metals, such as vanadium, deposited on a catalyst during a conversion reaction. Spent catalyst particles containing the metal deposits are introduced into a regenerator, and passivating particles containing the passivating materials are also introduced into the regenerator. The passivating particles and the catalyst particles are separated after they have exited from the regenerator. At least a portion of the separated passivating particles are recycled to the regenerator, and the regenerated, separated catalyst particles are reintroduced into a reaction zone, such as a riser conversion zone.

11 Claims, 3 Drawing Sheets

METHOD FOR REDUCING THE EFFECTS OF METALS ON FCC CATALYSTS

BACKGROUND OF THE INVENTION

1. Field of the Invention

The present invention relates to a method and apparatus for decreasing the effects of metals deposited on catalysts during a process of conversion of hydrocarbons to lower boiling fractions.

2. Discussion of the Prior Art

Although it has long been considered desirable to process residuals in FCC units, one long-standing problem which must be overcome before catalytic cracking of residuals can be performed economically relates to the harmful effects of vanadium or other metals deposited from oil on the cracking catalysts during the conversion reaction. It is known that the harmful effects of such deposition onto FCC catalysts can be reduced by adding certain materials to the catalyst in the reactor, either by incorporating these materials into the catalyst composition itself or by adding them as separate particles. These added particles serve to trap or passivate the metals. U.S. Pat. No. 4,451,355 to Mitchell et al and European Pat. No. 112,601 to de Jong, the disclosures of which are incorporated by reference herein, illustrate such known processes.

Examples of materials that exhibit the desired trapping effect on vanadium are sepiolite and perovskite, as disclosed in the above-cited patents. These passivating or trapping materials prevent the vanadium or other metals from migrating within and among the catalyst particles to zeolite sites which the vanadium or other metals would otherwise destroy. These passivating materials, which are added to the catalyst, are sent to the riser, so that they are present in the reactor during the conversion reaction. However, these passivating materials have poorer cracking activity, as disclosed by European Pat. No. 112,601, and lower selectivity to liquid products, as is characteristic of non-zeolite substances, than the catalyst alone. These disadvantages partially offset some of the improvement in catalyst performance resulting from the reduced effects of vanadium or other metals. Due to these limitations, prior art techniques for reducing the effects of vanadium on FCC catalysts have not been particularly efficient or economical.

SUMMARY OF THE INVENTION

It is, therefore, an object of the present invention to provide an improved method and apparatus for passivating metals deposited on catalysts during a hydrocarbon conversion reaction, in which the above-described problems of decreased cracking activity and poorer selectivity to liquid products in the prior art techniques are overcome.

According to the present invention, there is provided a process for passivating metal which is deposited on a catalyst during a hydrocarbon conversion reaction. In this process, spent catalyst particles containing metal deposits are introduced into a regenerator, and passivating particles containing passivating materials are also introduced into the regenerator. The passivating particles are separated from the catalyst particles after the passivating particles and the catalyst particles have exited from the regenrator. The passivating particles separated in the previous step are recycled to the regenerator, and separated regenerated catalyst particles are introduced into a reaction zone.

In one embodiment, the passivating particles are larger than, or denser than, the catalyst particles. In this embodiment, the separation step comprises introducing mixed passivating and catalyst particles which are exiting the regenerator into a vessel fluidized with a gas at a predetermined velocity below the terminal velocity of the passivating particles in this gas, but high enough to entrain a high flux of catalyst particles. Then the entrained catalyst particles are introduced into the reaction zone and the passivating particles contained in a fluidized bed in the aforesaid vessel are recycled to the regenerator using a lift pipe.

In another embodiment, the passivating particles are smaller than, or less dense than, the catalyst particles. In this embodiment, the separation step comprises introducing mixed passivating and catalyst particles exiting the regenerator into a vessel fluidized with a gas at a predetermined velocity below the terminal velocity of the catalyst particles in this gas, but high enough to entrain a high flux of passivating particles. Then, the regernerated catalyst contents of a fluidized bed in the vessel are introduced into the reaction zone and entrained passivating particles are recycled to the regenerator.

Alternatively, the separating step can comprise a plurality of separation stages to achieve a greater separation of passivating particles from the catalyst particles, thus increasing the efficiency of the system. Also, the separating step can comprise magnetically separating the passivating particles from the catalyst particles. In this embodiment, a magnetic material, e.g., iron, is added to the individual passivating particles. The mixed passivating and catalyst particles exiting the regenerator are passed through a magnetic field, which accomplishes the separation of the passivating and catalyst particles.

Also according to the present invention, there is provided a fluidized catalytic conversion system, which comprises a reactor, a regenerator, means for introducing spent catalyst particles from the reactor into the regenerator, and means for introducing passivating particles containing passivating materials into the regenerator. The system also includes means for removing a mixture of the passivating particles and the catalyst particles from the regenerator and a separation means. The separation means receives the aforesaid mixture from the removing means, and separates the passivating particles from the catalyst particles. A recycling means receives the passivating particles separated by the separation means and introduces them into the regenerator. Finally, another means receives the regenerated catalyst particles separated by the separation means and introduces them into the reactor. The reactor can comprise any means wherein conversion of hydrocarbons to lower boiling fractions is accomplished. The separation means can comprise a plurality of separation stages in order to achieve greater separation of passivating particles from catalyst particles. Also, the separation means can comprise an elutriator. Additionally, the separation means can comprise a magnetic separation means for use where the individual passivating particles have a magnetic material, e.g., iron, added thereto. The mixed passivating and catalyst particles removed from the regenerator are then passed through a magnetic field in the magnetic separator, which accomplishes the separation of the passivating and catalyst particles.

BRIEF DESCRIPTION OF THE DRAWINGS

The above and other objects, advantages and features of the present invention will be more fully understood when considered in conjunction with the following figures, of which.

DETAILED DESCRIPTION OF THE INVENTION

The present invention provide an improved FCC process and apparatus in which vanadium or other metals deposited on the catalyst composition during a conversion reaction are passivated. In this invention, passivating materials that trap the metals are incorporated into passivating particles, which are introduced as separate particles into the regenerator, where they perform the trapping or passivating function on spent catalyst particles which also have been introduced into the regenerator, thus making use of a well-known phenomenon involving the ability of vanadium and other metals to move from particle to particle in the regenerator. After passing through the regenerator, the passivating particles and the catalyst particles are separated in the stream leaving the regenerator. Then, the low metal-containing regenerated catalyst particles along are sent to the riser, while the passivating particles containing the metal traps are recycled to the regenerator. This yields an advantage, in that the low activity and low selectivity trapping materials are not directly or primarily introduced into the reactor, and therefore do not substantially contribute to the cracking reactions. Also advantageously, a large fraction of the metals are trapped; thus, this metal fraction does not enter the riser where it would otherwise decrease selectivity to liquid products by promoting the formation of hydrogen and coke.

An elutriation technique can be used to accomplish the separation of the passivating particles from the catalyst particles after they leave the regenerator. In this technique, separation of the particles containing the vanadium or metal trap from the catalyst particles is accomplished by exploiting density or particle size differences between the passivating particles and the catalyst particles.

Figure 1:
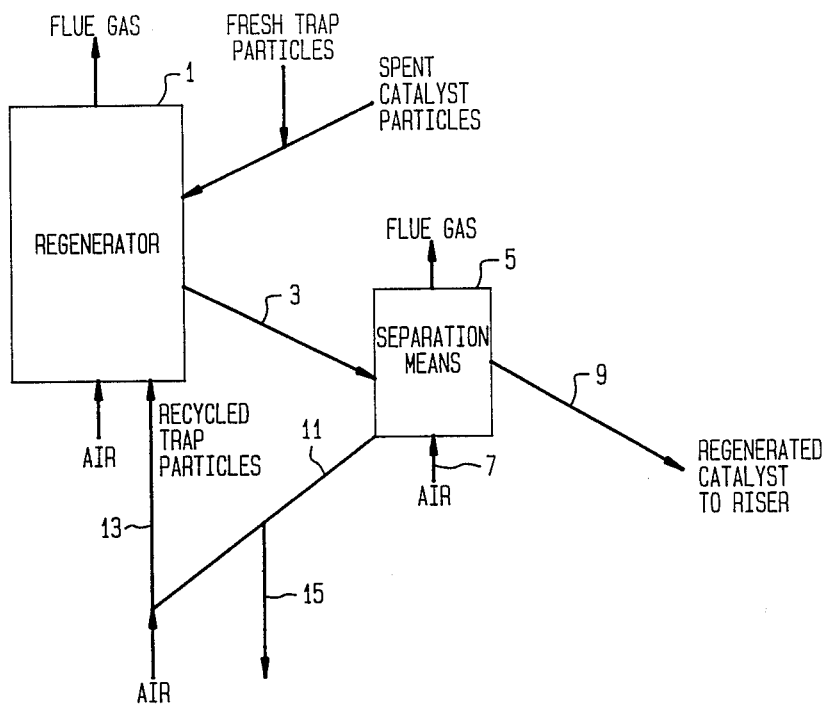
FIG. 1 is a schematic representation of a fluidized catalytic conversion system according to the present invention.

FIG. 1 illustrates one embodiment of the invention, wherein the passivating particles containing the metal trap are predominantly larger or more dense than the catalyst particles. Fresh passivating particles are introduced into line 29, which contains spent catalyst from the riser zone (not shown). Line 29 is fed into regenerator 1. The mixed passivating and catalyst particles leaving regenerator 1 at exit line 3 are continually fed to elutriation vessel 5, which is fluidized via line 7 with a gas, e.g., air, traveling at a velocity which is below the terminal velocity (in the particular gas being used) of the passivating particles containing the trapped materials, but which is high enough to entrain a high flux of the smaller or less dense catalyst particles. The entrained catalyst particles are sent via line 9 to the regenerator catalyst standpipe (not shown), while the contents of a fluidized bed within elutriation vessel 5 are totally or partially recycled via line 11 to regenerator 1 using a lift pipe 13. Line 15 is provided for removal of passivating particles when desired, i.e., without recycling them to regenerator 1.

Figure 2:
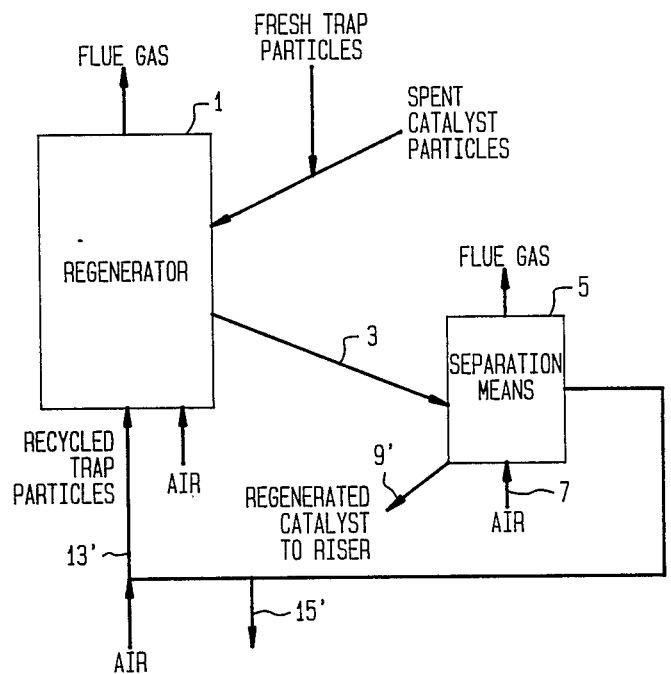
FIG. 2 is a schematic view of a second embodiment of a fluidized catalytic conversion system according to the invention.

Alternatively, the passivating particles can be made predominantly smaller or less dense than the catalyst particles. FIG. 2 illustrates this embodiment, in which the system operates similarly to the FIG. 1 embodiment, except that the passivating particles are entrained in the gas stream in vessel 5 and recycled to regenerator 1 via line 11' and lift pipe 13', while the regenerated catalyst particles are removed from the fluidized bed of vessel 5 via line 9' and sent to the riser. Line 15' is provided for removal of passivating particles when desired, without recycling them to regenerator 1. In this embodiment, the contents of the fluidized bed within vessel 5 constitute the regenerated catalyst particles which are sent via line 9' to the regenerated catalyst standpipe (not shown).

Figure 3:
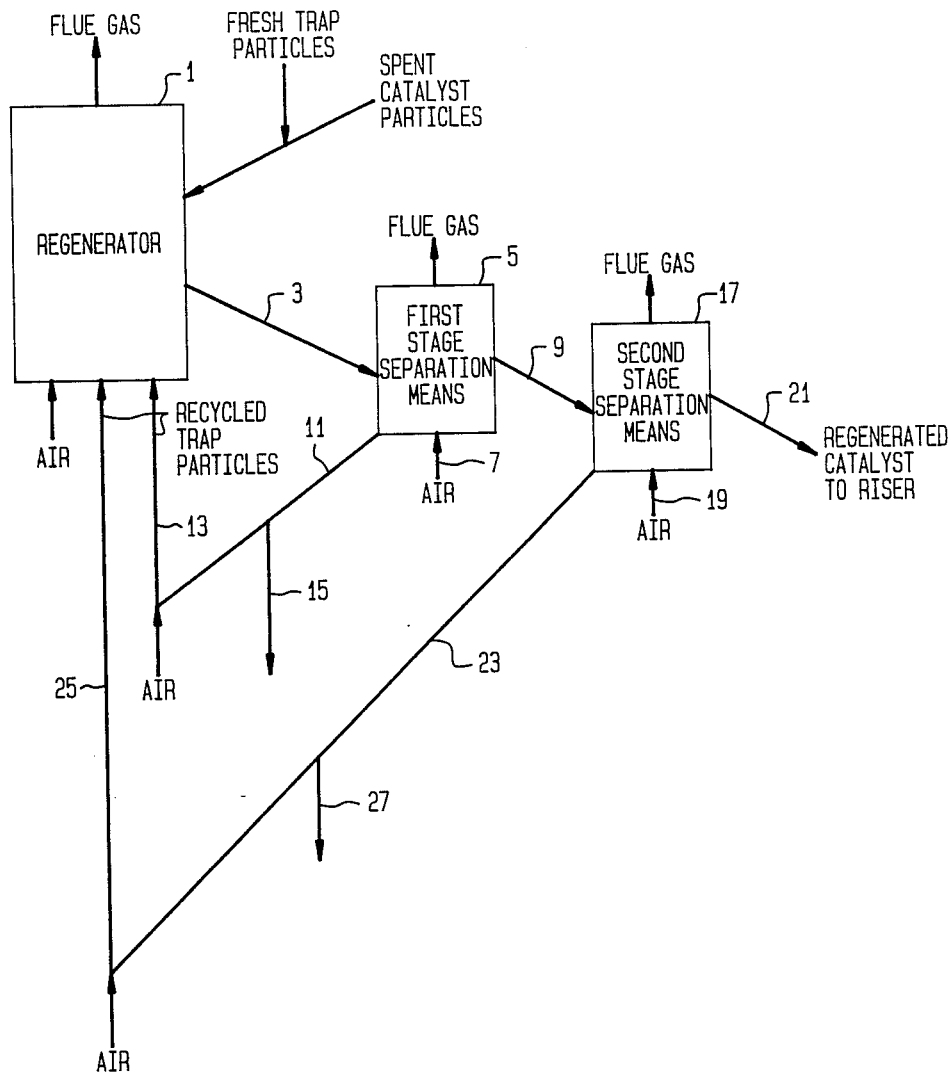
FIG. 3 illustrates another embodiment of a fluidized catalytic conversion system according to the invention.

As illustrated in FIG. 1, multiple separation stages can be used to achieve a greater separation of passivating particles from the catalyst particles, thus increasing the overall efficiency of the system. The multi-stage separation system of FIG. 3 is similar to FIG. 1, except that a second stage separation vessel 17 is provided, which receives the separated regenerated catalyst particles via line 9 from first stage vessel 5. The operation of vessel 17 is similar to that of vessel 5, such that entrained regenerated catalyst particles containing a small percentage of passivating particles are sent via line 9 to vessel 17. Vessel 17, similar to vessel 5, is fluidized at line 19 with a gas, e.g., air, traveling at a velocity which is below the terminal velocity (in the particular gas being used) of the passivating particles containing the trap, but which is high enough to entrain a high flux of the smaller or less dense catalyst particles. The entrained catalyst particles are sent via line 21 to the regenerated catalyst standpipe (not shown), while the contents of the fluidized bed within vessel 17 are totally or partially recycled via line 23 to regenerator 1 using a lift pipe 25. Line 27 is provided for removal of passivating particles from line 23 when desired, without recycling these passivating particles to regenerator 1.

It should be noted that the FIG. 2 embodiment, wherein the passivating particles are made predominantly smaller or less dense than the catalyst particles, can be modified to include a multi-stage separation system by introducing the regenerated catalyst containing a small percentage of passivating particles in line 9' to a second separation unit which is similar to vessel 5.

Alternatively, a magnetic separation system can be used to separate the passivating particles from the catalyst particles. In this technique, a magnetic material, e.g., iron, is added to the individual passivating particles. The mixed passivating and catalyst particles exiting the regenerator are passed through a magnetic field which accomplishes the separation. The separated regenerated catalyst particles are then sent to the riser or other reaction zone, while the separated passivating particles are either totally or partially recycled to the regenerator.

Figure 4:
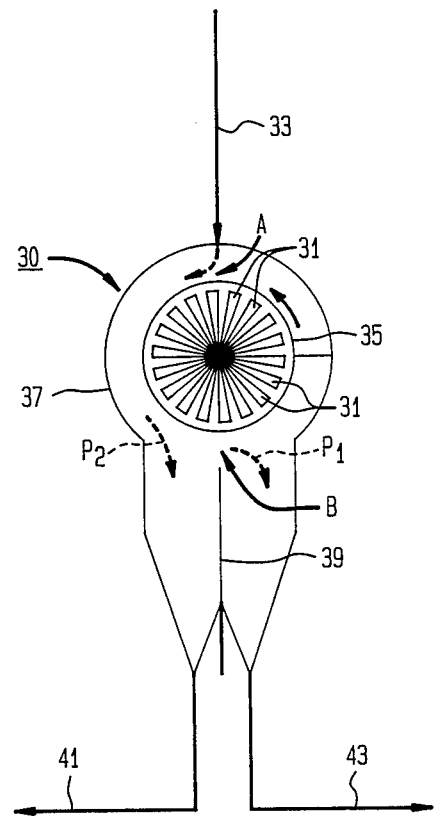
FIG. 4 illustrates a magnetic separation means for separating passivating particles from catalyst particles.

FIG. 4 illustrates an alternative embodiment of a magnetic separation means for separating the passivating particles from the catalyst particles. In this embodiment, the passivating particles are impregnated with a magnetizable substance, such as iron, to allow the separation. Separation means 30 comprises rotating drum 35 containing a plurality of electromagnetic coils 31, with drum 35 being disposed in housing 37. As drum 35 is rotated, e.g., counterclockwise, coils 31 are activated at the 12 o'lock position A and are deactivated at the 6 o'clock position B. As a result, when mixed passivating and catalyst particles are introduced via line 33 from the regenerator (not shown) into separator 30, the impregnated passivating particles are engaged with drum 35 at position A and disengaged therefrom at position B, so that the passivating particles descend to the right of baffle 39, along paths schematically represented by $P_1$, and pass into line 43 for recycling in whole or in part of the regenerator. The catalyst particles, on the other hand, will descend to the left of baffle 39, along paths schematically represented by $P_2$, and pass into line 41 to be introduced into the riser or other reactor means.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

We claim:

1. A process for passivating metal deposited on a cracking catalyst during a hydrocarbon conversion reaction, comprising:
   (a) introducing spent catalyst particles containing metal deposits into a regenerator;
   (b) introducing passivating particles containing passivating materials into said regenerator to trap a fraction of said metal deposits while said spent catalyst particles and said passivating particles are in said regenerator;
   (c) separating said passivating particles containing said passivating materials and trapped metal deposits from said catalyst particles which contain a lowered amount of metal deposits after said passivating particles and said catalyst particles have exited from said regenerator;
   (d) recycling at least a portion of said passivating particles separated in step (c) to said regenerator; and
   (e) introducing said catalyst particles containing said lowered amount of metal deposits, separated in step (c) into a reaction zone.

2. The process as in claim 1, wherein said passivating particles are larger than said catalyst particles.

3. The process as in claim 1, wherein said passivating particles are denser than said catalyst particles.

4. The process as in claim 1, wherein said passivating particles are smaller than said catalyst particles.

5. The process as in claim 1, wherein said passivating particles are less dense than said catalyst particles.

6. The process as in claim 1, wherein said metal is vanadium.

7. The process as in claim 1, wherein said separating step comprises a plurality of separation stages.

8. The process as in claim 2, wherein step (c) comprises introducing mixed passivating and catalyst particles exiting said regenerator into a vessel fluidized with a gas at a predetermined velocity below the terminal velocity of the passivating particles in said gas, but high enough to entrain a high flux of catalyst particles, step (e) comprises introducing entrained catalyst particles into said reaction zone, and step (d) comprises recycling the contents of a fluidized bed in said vessel to said regenerator using a lift pipe.

9. The process as in claim 3, wherein step (c) comprises introducing mixed passivating and catalyst particles exiting said regenerator into a vessel fluidized with a gas at a predetermined velocity below the terminal velocity of the passivating particles in said gas, but high enough to entrain a high flux of catalyst particles, step (e) comprises introducing entrained catalyst particles into said reaction zone, and step (d) comprises recycling the contents of a fluidized bed in said vessel to said regenerator using a lift pipe.

10. The process as in claim 4, wherein step (c) comprises introducing mixed passivating and catalyst particles exiting said regenerator into a vessel fluidized with a gas at a predetermined velocity below the terminal velocity of the catalyst particles in said gas, but high enough to entrain a high flux of catalyst particles, step (e) comprises introducing the contents of a fluidized bed in said vessel into said reaction zone, and step (d) comprises recycling entrained passivating particles to said regenerator.

11. The process as in claim 5, wherein said (c) comprises introducing mixed passivating and catalyst particles exiting said regenerator into a vessel fluidized with a gas at a predetermined velocity below the terminal velocity of the catalyst particles in said gas, but high enough to entrain a high flux of passivating particles, step (e) comprises introducing the contents of a fluidized bed in said vessel into said reaction zone, and step (d) comprises recycling entrained passivating particles to said regenerator.

* * * * *